Nov. 5, 1963 L. D. HARMON ETAL 3,109,226

FABRICATION OF PRINTED CIRCUIT APPARATUS

Original Filed Dec. 19, 1958 2 Sheets-Sheet 1

INVENTORS: L. D. HARMON
C. F. MATTKE

BY G. E. Hirsch Jr.

ATTORNEY

Nov. 5, 1963 L. D. HARMON ETAL 3,109,226

FABRICATION OF PRINTED CIRCUIT APPARATUS

Original Filed Dec. 19, 1958 2 Sheets-Sheet 2

INVENTORS: L. D. HARMON
C. F. MATTKE

BY Q. E. Hirsch Jr.

ATTORNEY

United States Patent Office 3,109,226
Patented Nov. 5, 1963

3,109,226

FABRICATION OF PRINTED CIRCUIT APPARATUS

Leon D. Harmon, Warren Township, Somerset County, and Charles F. Mattke, Fanwood, N.J., assignors to Bell Telephone Laboratories, Incorporated, New York, N.Y., a corporation of New York Original application Dec. 19, 1958, Ser. No. 781,627, now Patent No. 3,027,528, dated Mar. 27, 1962. Divided and this application Dec. 8, 1960, Ser. No. 74,712
6 Claims. (Cl. 29—155.5)

This invention relates to photoelectric structures and more particularly to a method of manufacturing densely packed arrays of small individual photocells each with a separate attached electrical conductor. It has for its object to reduce substantially the physical size of such arrays and to simplify the process and methods by which they are constructed.

This application is a division of application Serial No. 781,627, filed December 19, 1958.

Miniature closed circuit television equipment, apparatus for the automatic recognition of geometrical line drawings, patterns, written characters, and the like can be greatly simplified if the usual procedure for sequentially scanning elemental areas or cells of the pick-up transducer is abandoned and simultaneous or parallel readout of the information available in the individual cells is adopted. For sufficiently high resolution, a transducer should contain a large number of relatively small cells closely packed to form a two-dimensional array. Parallel readout of the many individual cells in the miniature array requires, however, a separate output lead from each cell. If, on the one hand, the array is composed of individually manufactured cells bonded together in a suitable fashion to form a target, the resultant structure is generally too large for use in miniature pick-up equipment. Moreover, the individual cells must be inserted in the array one at a time, are individually very expensive, and by virtue of the separate mountings are necessarily limited in resolution. If, on the other hand, an array of miniature cells is produced by mechanically or chemically precipitating photoconductive material in depressions, or the like, provided on a support member, or by vacuum depositing individual cells directly on a target, the attachment of lead wires to the individual cells becomes a difficult and costly procedure. Additionally, cross talk among the cells limits the usefulness of such arrays.

In accordance with the present invention, these difficulties are overcome by forming a mosaic or retina-like array of miniature photosensitive cells, each complete with an associated conducting lead, on a target structure by means of printed circuit techniques. Lead separation is insured by employing for each individual cell one of a number of etched wires on a printed circuit card. According to the invention, the wires terminate at closely spaced points at an edge of the card normal to the direction of the printed wires on the card, and at widely spaced points on another edge to permit each individual wire end to be connected conveniently to an external circuit. Several of the printed circuit cards stacked together form at the ends normal to the wiring direction, a substantially plane surface containing an array of wire ends. A conductive layer deposited on this end surface and photoetched to form insulated domains or wells associated with each wire end serves as a printed circuit board upon which are formed distributed receptacles for photosensitive material. A layer of the material "painted" on the conductive surface fills the wells to form individual photocells between the common conductive coating and the printed wires extending into the wells. The conductive layer is connected to an electrical terminal common to all of the photocells, and consequently is inert insofar as photosensitive material deposited thereon is concerned. Hence there is no need to remove excess material deposited on the surface in the painting process. The advantages of this procedure are obvious. The entire surface of the transducer may be protected, if desired, by sealing the entire surface in a transparent layer of an inert material such as plastic, glass or the like.

Other objects, features, the nature of the present invention and its various advantages will be more fully understood upon consideration of the appended drawings and the following detailed description of the drawings. In the drawings.

Figure 1:
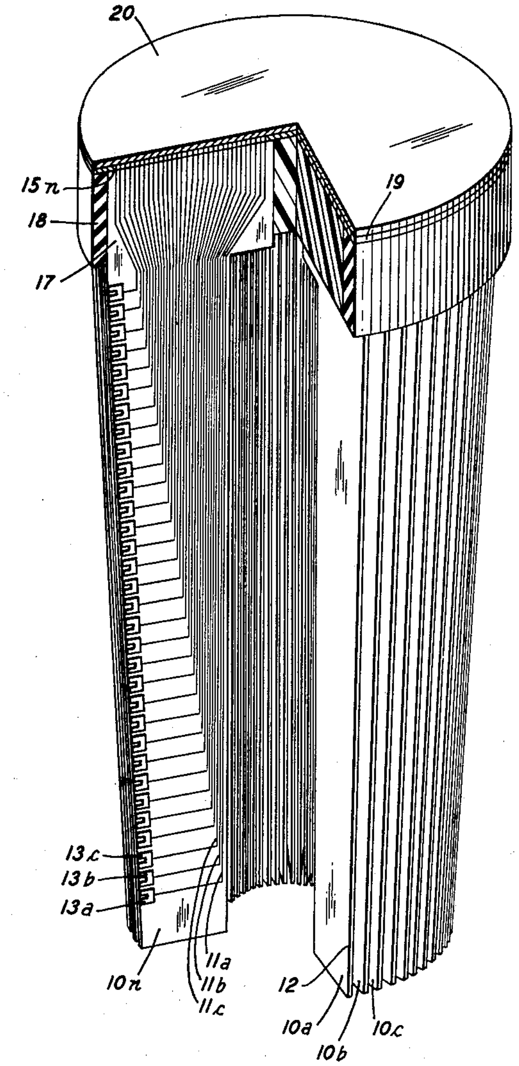
FIG. 1 is a perspective view illustrating the structural formation of a photosensitive transducer according to a preferred embodiment of the invention.
Figure 2:
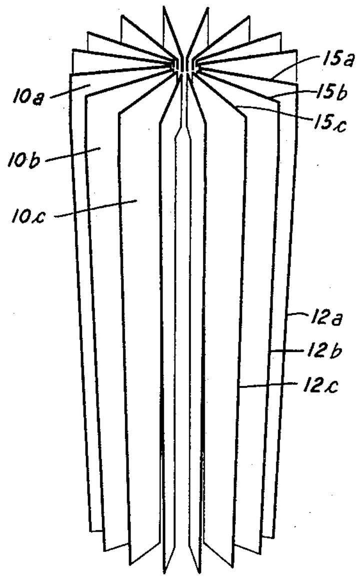
FIG. 2 is a greatly simplified diagram illustrating a number of printed circuit cards arranged with radial symmetry to support a photocell array.

A preferred embodiment of the features of the invention is illustrated in FIG. 1. The figure shows a multiple-unit photosensitive transducer comprising a plurality of printed circuit cards 10*a*, 10*b*, 10*c* . . ., symmetrically arranged with one long edge of each card parallel to a common axis to form a rigid structure. The greatly simplified diagram of FIG. 2 illustrates a radial arrangement of cards forming a unitary structure of this sort. For a typical transducer, each card is approximately one inch wide and approximately six inches long. It is evident that a great number of sufficiently thin rigid cards may be stacked together in a radial arrangement. For example, 64 cards equispaced around 360 degrees may be oriented in this fashion with one long edge of each card parallel to a common central axis.

Returning once again to FIG. 1, each of the insulating cards has a number of small, closely spaced parallel etched lines 11*a*, 11*b*, 11*c* . . ., of a conductive material, such as copper, running the length of the card. One end of each conductor is a terminus for external connections and the other end of each conductor is the incipient site of a photocell. The edges 12*a*, 12*b*, 12*c* . . ., of the printed circuit cards may be suitably tapered so that individual terminals 13*a*, 13*b*, 13*c* . . ., are spaced sufficiently far apart to permit a plurality of wires in a cable, for example, to be soldered or otherwise connected to them and thus to each one of the printed conductors.

In the structure shown in FIG. 1 the ends of the wires at the upper ends of the cards 10 terminate at points equispaced on the upper edges 15*a*, 15*b*, 15*c* . . ., of the several cards. The upper portion of the structure including the edges 15 of the printed cards, is potted, for example, by embedding the cards in an epoxy resin or the like for a portion of their lengths. Although epoxy resin is a preferred binder, any plastic material that can be applied as a liquid, hardens to form a surface that may be machined, and is an electrical insulator may, of course, be employed. The imperforate volume or head 17 may be bounded by a support ring 18 or by a similar container. The ring 18 may be retained as a part of the transducer structure. However, for some miniature applications it may be desirable to remove it as soon as the plastic material has hardened. A suitable fixture (not shown) may be provided additionally to support the individual cards at points along the central axis to form a rigid structure.

The encapsulated end of the structure is faced off by grinding and lapping, for example, to produce a relatively smooth circular surface, substantially perpendicular to the common central axis. Embedded in it are the edges 15 of the printed circuit cards in a spoke-like array viewed edge on with the exposed ends of the separate wires spaced along each edge. Upon this smooth surface is deposited a uniform conductive layer 19 extending over selected portions of the surface area. For example, an evaporated layer of copper may be etched with an array of apertures or domains centered about the wire ends. With this arrangement, the patterned layer of copper on the smooth end surface of the structure forms a printed circuit card, to be described more fully hereinafter, perpendicular to the planes of the cards 10. Each aperture is centered about one of the wires 11 and is in turn surrounded by a plane of copper that extends to the site of the next adjacent well. In practice, annular "moats", formed by etching or the like, are centered about each wire end so that a "cap" of copper is left on each wire end.

Each of the moats is filled with a photoconductive material deposited as a layer 20 on the patterned layer 19, i.e., the layer 20 may simply cover the entire conductive layer 19 and in doing so, fill each moat. Consequently, each filled moat constitutes an individual miniature photoconductive cell deposited on an insulating substrate and connected between the common conductive layer 19 and one of the wires extending into the corresponding moat. Preferably, the conductive layer 19 is connected as the common ground pole for all of the cells. The material overlaying the indifferent conductive layer 19 and the conductive cap forming the individual electrode has no potential field across any part of it and consequently has no effect on the operation of the cells. The active site of each cell is, thus, restricted to approximately the region of the photoconductive material in each moat.

Figure 3:
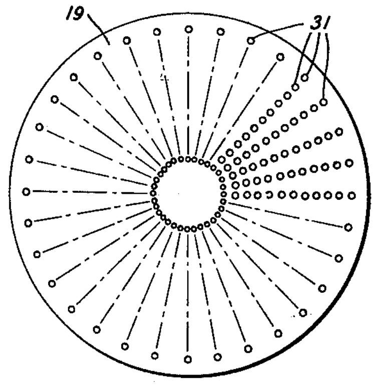
FIG. 3 is an enlarged diagram illustrating the radial distribution of individual photocells in accordance with the preferred embodiment of the invention.

FIG. 3 shows a top view of the printed circuit card formed by the patterned conductive layer 19 before the photoconductive material has been applied. For the radially symmetrical array shown, the plurality of moats 31 surrounding the wire ends are disposed along a spoke-like array of radial lines. If 64 printed circuit cards are used to form the array, each with 32 parallel etched wires, 2048 ($32\times64$) separate wires extend into the printed circuit board normal to the cards 10. In a typical example, an entire array of 2048 completed cells is contained in a circle approximately two inches in diameter.

Other configurations of printed circuit cables may, of course, be constructed using the principles outlined above. Thus, although the radially symmetrical array of FIGS. 1 through 3 is particularly well suited to transducers used for character reading devices and the like, a Cartesian array of cells is preferred for use in miniature television apparatus, in unscanned or parallel readout camera devices, and the like. In any case, a large number of individual cells, individually connected by separate wires to an external circuit, may be formed in a miniature structure in which crossstalk is minimized.

Figure 4:
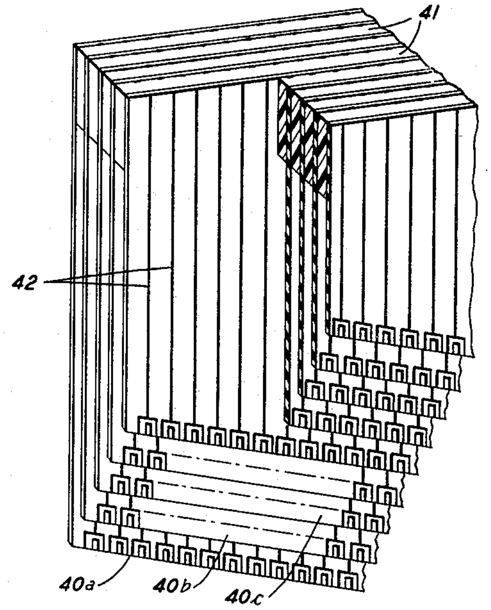
FIG. 4 is a perspective view illustrating the structural formation of a Cartesian coordinate array of photocells.

A multiple-unit photosensitive transducer in which the individual cells are arranged in Cartesian coordinate fashion is illustrated in FIG. 4. The plurality of cards 40*a*, 40*b*, 40*c* . . . , are stacked together in parallel planes adjacent to one another to form a support structure. The edges of all of the cards are arranged at one end to form a plane 41 upon which a printed circuit may be developed. The other ends of the cards are suitably separated, by staggering for example, in either one direction or in both to provide access to wires printed on the cards. As in the case of the structure shown in FIG. 1, each card has a plurality of separated conductive lines 42 running the length of the card, i.e., perpendicular to the edges forming the surface 41. If the parallel conductors are etched on only one side of each insulating card, the adjacent cards may be stacked tightly together to provide in the plane 41 a matrix of wire ends substantially in rectangular form. Alternatively, if conductors are provided on both sides of the cards, a thin insulating sheet is inserted between adjacent cards. The boards may be suitably encapsulated to permit the surface 41 to be machined to mirror smoothness to expose the wire ends. As before, the surface supports a thin layer of copper etched about each wire end to form wells or moats. Photoconductive material placed in each insulating domain constitutes one of the individual photocells of the matrix.

It is evident that the structural simplicity of the multiple-unit photocell, according to the invention, avoids many of the problems associated with the construction of large arrays of miniature photocells. Specifically, numerous extremely small cells, each with a separate lead, packed closely together to form a high resolution array may be economically manufactured en masse. The use of printed circuit techniques, both for the plurality of individual conductive leads and for the production of the individual miniature cells themselves is, in large measure, responsible for these economies.

Figure 6:
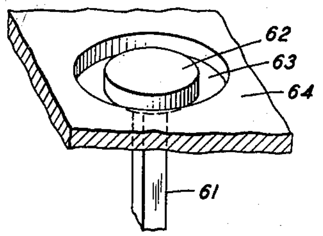
FIG. 6 is a fragmentary perspective view illustrating the treatment of one of the wire ends shown in FIG. 5.
Figure 5:
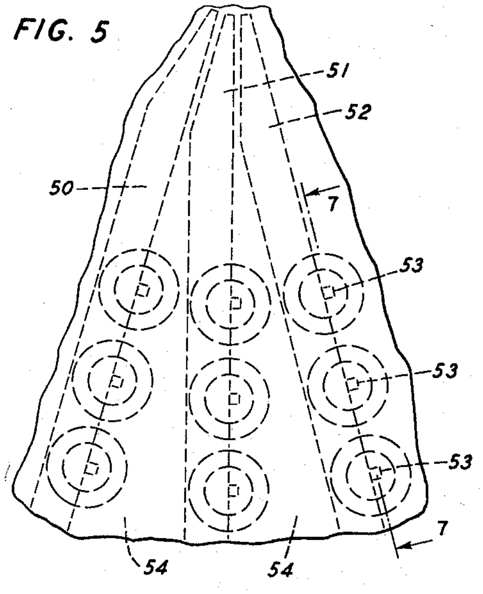
FIG. 5 is an enlarged view of a portion of the etched surface of a photocell array.
Figure 7:
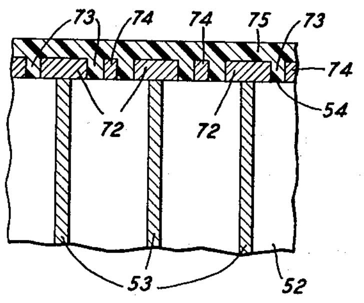
FIG. 7 is a cross-sectional view taken along the line 7—7 of FIG. 5 and viewed in the direction of the arrows.

FIGS. 5 through 7 illustrate an individual cell according to the invention in a typical environment at various stages of its manufacture. A number of printed circuit cards 50, 51, and 52, viewed end on, are shown in FIG. 5 fixedly arranged in the spaced radial relation shown in FIG. 2. The edges of the cards containing the ends of individual wires 53 deposited on the boards are rigidly supported in an electrically insulated manner to form a unitary structure at the ends of the cards. To permit thicker cards to be used, and further, to allow the wire ends more closely to approach the common center, the inner edges of the cards may be tapered toward the center axis. Epoxy resin is poured into the end of the structure and allowed to flow into the array for about one inch of the lengths of the cards. The actual depth of penetration of the binder is not at all critical but depends primarily on the shape and configuration of the printed cards employed. A support ring, as previously described, may be used temporarily to aid in forming the molded end, and the plastic may be debubbled by standard vacuum techniques if desired. It is then postcured for approximately two hours at 185 degrees Fahrenheit to yield a smooth hard volume 54. The end of the array is faced off in a lathe to provide a relatively smooth surface perpendicular to the plane of the cards (in the plane of the drawing of FIG. 5) in which are embedded the printed circuit cards and the copper rectangular ends of the etched lines. The surface is polished, for example, with Aloxite 600 paper followed by Linde "A" polishing compound, until the surface is mirror smooth and all details of the copper end sections are plainly visible.

A photograph is made of the finished surface with sufficient accuracy to show the details of the matrix formed by the wire ends. The photograph is enlarged to a positive print with precisely known dimensions approximately fifteen times as large as the original. The print should be made on a dimensionally stable material. As an example, if the cross-sections of wire ends are approximately .002 inch by .003 inch originally, they appear on the enlargement as approximately .03 inch by .045 inch rectangles. A translucent overlay placed over the enlarged print is marked with the exact centers of the enlarged copper cross-sections, and, in the example of practice described hereinabove, an annular ring is drawn about each of the marked centers. The diameters of the inner and outer circles defining the rings are carefully selected so that the diameter of the inner circle is equal to or greater than the diagonal of the copper rectangles and the diameter of the outer circles is proportionately larger e.g., a ratio of two to one is suitable. The areas between pairs of outlining circles are filled with opaque ink or the like. Suitable photographic processing is used to reduce the completed drawing to the exact physical size of the original print and the resulting transparency, having dark rings on a clear background, is used as a printing mask.

The surface of the potted array is cleaned and given an evaporated deposit of an electrically conductive material such as copper approximately 5000 angstroms thick. Vacuum techniques for depositing extremely thin layers on a substrate are well known in the art. Alternatively, the conductive coating may be applied by brushing, spraying or submerging. The thin plating, adhering both to the cross-sections of the copper lines and to the polished epoxy between the wire ends, is subsequently coated with a standard photo-resist material preparatory to light exposure and etching. The photographic mask, prepared as above described, is carefully registered in place on this surface, and the surface is exposed and etched in the conventional manner.

On completion of the etching process, the structure has a surface of etched copper with each wire cross-section capped by a disk of copper and surrounded by an etched insulating moat as shown in FIG. 5. The etched surface is, in effect, a new printed circuit card normal to the cards 50, 51, and 52 in which the individual caps and moats are precisely defined. In a preferred form of the invention, the caps and moats are the same size for all cells. It is not at all necessary that they be so, however. Thus, if it is desired to produce an array of cells according to another prescribed pattern, e.g., a non-uniform pattern of cells, the diameters of the moat boundaries or the ratio of the diameters of the boundaries may be varied from cell to cell.

FIG. 6 is a perspective view of a single wire end treated in the fashion outlined above. A single copper wire 61, approximately .002 by .003 inch in cross-section, printed on a card (not shown) terminates at its upper end in a disk of copper 62 whose thickness, in the selected example, is approximately 5000 A. Its diameter may be approximately .005 inch. Surrounding the cap 62 is an insulating ring or moat 63 extending through the copper layer to the polished epoxy surface (not shown). The inside diameter of the moat is equal to the diameter of the cap, i.e., .005 inch, and its outside diameter is approximately .012 inch to yield an insulating ring .0035 inch thick. The ring in turn is bounded by a continuous sheet of copper 64. As may be seen in FIG. 5, the sheet 64 extends to the boundary edge of the next adjacent annular ring. In a typical application, the sheet 64 is connected as the common electrical pole for all of the individual cells and each capped wire, e.g., 61—62, acts as the electrode for one individual cell. A direct current source of approximately 150 volts provides the necessary difference of potential between the two.

The new printed circuit card, with etched insulating areas associated with each wire end, is next coated with a layer of photoconductive material sufficiently thick to fill all of the insulating areas. The photoconductive material may be any of the compounds well known in the art, such as the sulphides or selenides of lead or cadmium. Preferably, cadmium sulphide is used. It has a spectral response with a broad peak centered about 6500 angstroms and has a dark resistivity of between $10^{10}$ to $10^{12}$ ohm-centimeters. When illuminated with an intensity of approximately 10 foot-candles, its resistivity drops to about $10^4$ ohm-centimeters. Like most photoconductors CdS has a response time of a few tenths of a second when illuminated with light of several foot-candles' intensity. The rise time is approximately equal to the decay time and both decrease with increasing levels of illumination. The impedance of a cell contained in a moat of the sort described above is a function of the logarithm of the ratio of the diameters of the inner and outer boundaries of the moat. With the cell spacing indicated above, and with the dark resistance characteristic of the photoconductive material employed for the cells, crosstalk between cells is extremely low.

Since cadmium sulphide is amorphous in its commercially available form, it is preferably given mechanical strength by the addition of a plastic material in a suitable solvent. Thus, the powder may be carried in a plastic binder such as ethyl cellulose, polystyrene or the like. The photoconductive material may, of course, be applied to the surface in any well-known fashion without a binder; for example, it may be forced into the moats under pressure. In practice, the conductive powder is mixed with four percent (by weight) of an acrylic resin as a binder and dissolved in toluene. The solution is sprayed on the prepared surface to a thickness of approximately .010 inch. Upon air drying, the material forms a layer permanently bonded to the surface of the structure. The active site of each cell is restricted, however, to the immediate region surrounding each of the wire ends. If desired, a transparent covering of glass, plastic or the like may be applied to the completed surface to form an air and moisture tight protective seal. The seal may, in fact, encase the entire structure leaving only the external terminals exposed.

FIG. 7 is a sectional view of several of the completed cells taken along the line 7—7 of FIG. 5 and viewed in the direction of the arrows. The card 52 containing the closely spaced parallel wires 53 supports at its edge 54 the series of copper caps 72 interspersed with gaps 73 representative of the etched annular moats on the surface. A layer of photoconductive material 75 covers the surface and fills each moat. Since the excess photoconductive material deposited outside of the several moats, covering the copper caps and separating copper portions, is electrically inert, it need not be removed, i.e., only the photoconductive material filling the moats between the common electrode 74 and one of the caps 73 constitutes an active cell. This is a great advantage since it considerably reduces the number of steps necessary to manufacture the cells.

While the invention has been described primarily in terms of a preferred structure and preferred process for manufacturing it, various other arrangements within the spirit and scope of the invention will readily occur to one skilled in the art.

What is claimed is:

1. The method of manufacturing a plurality of individual cells of photoconductive material that comprises,
arranging a plurality of printed circuit cards each supporting a number of individual printed wires to form a structure having a substantially plane surface in which one end of each of said wires terminates,
securing said arrangement of cards to form a rigid structure,
coating said surface with conductive material, etching moats in said conductive layer around each one of said terminating wire ends,
filling each one of said moats with photoconductive material,
and bonding said photoconductive material to the walls of said moats.

2. The method of manufacturing a plurality of individual cells of photoconductive material as defined in claim 1,
wherein each one of said moats is filled with cadmium sulphide in a plastic binder.

3. The method of manufacturing an array of individual light sensitive cells that comprises,
arranging a plurality of printed circuit cards each supporting a number of individual etched wires to form a structure having a plane surface in which one end of each of said wires terminates,
embedding the ends of said cards forming said plane surface in an electrically insulating binder to form a rigid structure,
dressing the end of said rigid structure supporting said card ends to produce a relatively smooth face in which the terminating ends of all of said wires are exposed, coating said face with a conductive material etching insulating apertures in said conductive coating around each one of said terminating wire ends, depositing a material whose conductivity is a function of incident light on said face to fill all of said apertures, and sealing said face with a substantially transparent layer of an inert material.

4. The method of manufacturing a miniature array of individual photoelectric cells which comprises, rigidly arranging a plurality of printed circuit cards each supporting a number of individual etched wires to form a structure having a substantially plane surface in which one end of each of said wires terminates, potting the ends of said cards forming said plane surface with a plastic material, polishing the potted ends of said cards to produce a relatively smooth face in which said wire ends are exposed, coating said polished face with a conductive material, etching moats in said conductive coating around each one of said terminating wire ends, and conductively bonding material whose resistivity is an inverse function of incident light in each of said moats.

5. The method of manufacturing an array of photoresistive cells that includes the steps of:

orienting a plurality of printed circuit cards each supporting a number of separate etched wires to form a geometrical structure having a plane surface in which one end of each of said wires terminates, encaspulating at least the ends of said cards which together form said plane surface to form a rigid structure, facing said encapsulated plane surface to produce a relatively smooth surface, capping each of the wire ends exposed in said smooth surface with a thin disk of a conductive material, coating those portions of said smooth surface exterior to and separated from said conductive disks with a continuous thin layer of a conductive material, coating the areas between each of said disks and said layer of conductive material with a layer of amorphous photoconductive material in a liquid carrier, and drying said surface to bond said photoconductive material permanently to the surface of said structure.

6. The method of manufacturing an array of miniature photoelectric cells which includes the steps of:

securing a plurality of printed circuit cards each supporting a number of separate etched wires in a unitary geometrical structure having a plane surface in which one end of each of said wires terminates, capping each of said wire ends with a thin substantially circular disk of a conductive material, coating all of the portions of said plane surface exterior to and separated from said conductive disks with a continuous thin layer of a conductive material, spraying the areas between each of said disks and said layer of conductive material with a photoconductive material in a liquid carrier, and drying said areas to form a layer of photoconductive material permanently bonded to the surface of said geometrical structure.

References Cited in the file of this patent

UNITED STATES PATENTS

| | | |
|---|---|---|
| 2,728,835 | Mueller | Dec. 27, 1955 |
| 2,899,659 | McIlvaine | Aug. 11, 1959 |
| 2,902,628 | Leno | Sept. 1, 1959 |
| 2,946,877 | Nalette et al. | July 26, 1960 |